Feb. 20, 1945.   F. D. O'TOOLE   2,369,977
AUTOMOBILE ALARM
Filed April 8, 1942

Inventor
FRANCIS D. O'TOOLE.
By Howard J. Whelan.
Attorney

Patented Feb. 20, 1945

2,369,977

UNITED STATES PATENT OFFICE 2,369,977

AUTOMOBILE ALARM

Francis D. O'Toole, Baltimore, Md.

Application April 8, 1942, Serial No. 438,156

3 Claims. (Cl. 200—52)

This invention refers to automobiles and the like, and more particularly to alarm devices for the prevention of the unauthorized removal of parts, especially tires and wheels, which necessitate the jacking up of the automobile to remove them. It has among its objects to provide a device of this nature that will be relatively simple in construction and principle, but effective in operation. Another object is to have all necessary adjustments provided in the device to render it practical for automobiles stopped on an inclined roadway or some other unusual situations, as well as on level ground. Still another object is to have the device arranged so it will indicate visually whether it is operating properly, and also provide it with protective covering that will make unauthorized tampering with the working parts very difficult.

A further object is to provide the device with means for protecting and restraining the operative parts while the automobile is travelling and the device is not set for operation.

Other objects will become apparent as the invention is more fully set forth.

The purpose of this invention is to provide a device that may be readily attached to a suitable portion of an automobile which is inaccessible to the outsider when it is locked up, but available and observable to the owner or user of the automobile, when he is in the vehicle. It is constructed simply and attaches to the dashboard, preferably. After adjustment and setting, the device is ready to operate, if the automobile is raised to remove a tire or wheel, or lowered after the wheel or tire is removed, in an unauthorized manner. Other devices have been devised to anticipate the tilting of the car by high speeds or interference with their operating functions. They depend on variations in the level of the automobile's position especially when travelling along, but this device operates when the vehicle is in a stationary position and the level is disturbed by jacking up or lowering of a side or end of the automobile.

In the drawing, which illustrates an example of a device exemplifying this invention:

Similar reference characters refer to similar parts throughout the drawing.

Figure 1:
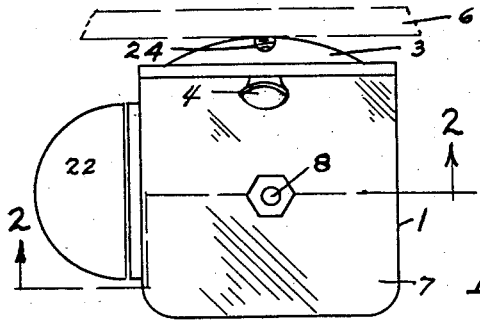
Figure 1 is a plan view of a device embodying the invention.
Figure 4:
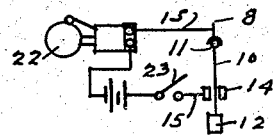
Figure 4 is a wiring diagram of the device.
Figure 2:
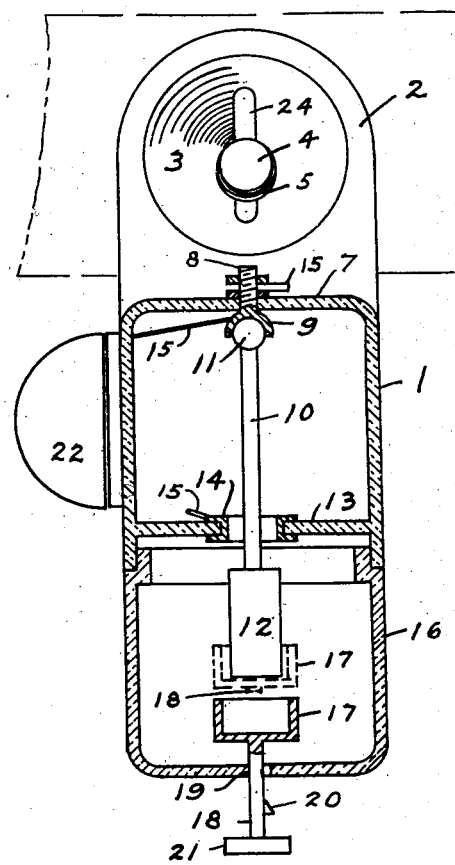
Figure 2 is a section taken along line 2—2 of Figure 1.

In the construction shown in the drawing, 1 represents a casing of transparent material, preferably of a plastic nature. This casing has an arm 2 that is arranged with a curved portion 3. The curved portion 3 is provided with a slot 24 through which a bolt 4 projects therethrough and washer 5 for adjustably holding it to a suitable portion of a vehicle 6. The casing has a cap 7 through which an electrical contact screw 8 projects and supports a ball joint 9. A metal rod 10 has its end portion 11 formed to roll in the joint, while its other end portion is weighted with a pendulum bob 12, and is allowed to swing through a substantial arc. A central insulated partition 13 is situated above the pendulum bob and has a metal collar 14 mounted in it, through which the rod 10 extends freely. The collar controls the amount of swing that the rod can make and also is connected to a circuit 15, which is closed when the metal rod comes into contact with it, at any point.

The lower portion of the casing has a removable inverted cover 16 mounted on it for protecting the pendulum against external interference, and also supporting a bell-like cap 17 on its stem 18. This cap 17 slides over the pendulum and keeps it from moving when the device is not set for operation. The stem slides through a hole 19 in the cover 16 and has a catch 20 for holding it in place as needed. The handle 21 serves as a convenient means for operating the cap and also closing the cover 16 dust-tight.

A bell alarm 22 is secured to the casing, and is operated through the circuit 15 when the device operates.

The operation of the device is as follows: The user first sets the device in a vertical plane by adjusting the bolt 4 and allowing the casing to assume a vertical position, regardless of the position of the automobile or incline of the roadway it is on. This position of the device brings the metal rod and pendulum into the vertical position also, and out of contact with collar 14. The cap 17 is then released from the pendulum bob, by pulling it down after releasing the catch 20. This leaves the bob set to operate. Any movement of the automobile off the level it has been parked in also tilts the device except the pendulum which being hung freely holds its vertical position, due to the action of gravity. This will allow the pendulum rod 10 to contact the collar and set off the alarm by closing the circuit 15. The transparency of the casing enables the user to observe the parts of the device and see that they are properly leveled. This avoids the use of levels for observing the position of the pendulum with respect to its circuit and the alarm. When the alarm sounds and calls attention to the condition of the automobile it may be disconnected by opening the switch 23 provided for that purpose.

Figure 3:
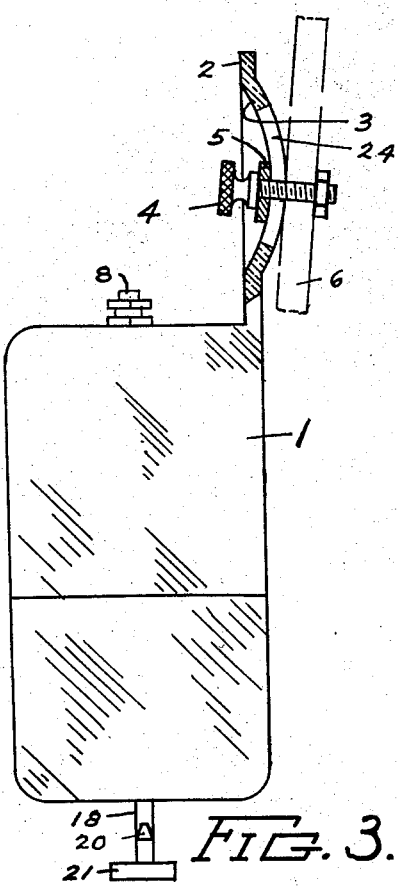
Figure 3 is a side view of Figure 1.

The dished arm 2 projecting from the upper portion of the casing 1 as indicated in Figure 3, serves to permit a vertical movement of the casing. The slot 24 and bolt 4 passing therethrough from a stationary member 6, enable the arm to be brought up and in doing so tilt the casing 1 angularly by reason of the convex contact with the member 6. It is a very quick way of providing adjustment for the casing, to suit an angular position the auto may be standing in when parked, and thereby place the pendulum in a suitable position ready for operation.

While but one general form of the invention is shown in the drawing, and described in the specifications, it is not desired to limit this application for patent to this particular form or in any other way otherwise than limited by the scope thereof, as it is appreciated that other forms could be made that would use the same principles and come within the scope of the appended claims.

Having thus described the invention what is claimed is:

1. A pendulum switch comprising in combination, a casing having plural closed compartments arranged vertically over one another with openings permitting access from one to the other, a ball joint member attached to the upper portion of the top compartment and adjustably arranged therein for circuit connection thereto, a pendulum with pending rod and weight having its head portion freely held by the ball joint with its rod extending through the compartments within the casing and its weight deposed in the lowermost compartment so as to swing therein, means connected with the casing for contacting the rod when moved out of a vertical position and completing the circuit aforesaid through the same, said means consisting of a ring rigidly held in the casing between compartments thereof and aligned with the middle portion of the rod, a cap adjustably attached to the casing adapted to predeterminedly cover and hold the said weight and prevent it from operating, and an arm having an arcuate surface on the upper portion of the casing with a slot therein for a bolt to attach it to a stationary object and permit it to be held in various vertical positions to bring the pendulum to a vertical position.

2. A pendulum switch of the class described comprising in combination, a casing, having a pair of compartments one above the other, and separated by an intermediate partition located transversely across the casing, the lower one being removably attached to the upper, the partition for separating the compartments from each other having a hole therethrough, a bob or weight pending in the lower compartment, a rod supporting the said bob vertically extending through the hole and having a ball head at its upper portion close to the casing and adapted to suspend the rod and permit it to swing freely to the extent permitted by the sides of said hole, a cover for the bob adapted to rise from the bottom of the casing and rigidly encompass the bob to prevent it from swinging as predetermined when placed thereon, an arm for supporting the casing having a convexed dished form adapted for attachment to a flat stationary surface, a bolt means adjustable in the arm and adapted to hold the same in place and permit an angular adjustment of the casing with the convexed surface in contact with the flat surface for placing the casing and weight therein in operative positions, and means for electrically connecting circuit means through the rod and ball joint and portions of the casing contacted thereby.

3. A pendulum switch unit comprising in combination, a casing having a pair of compartments with an intervening partition therebetween having a passage therethrough extending from one compartment to the other in a vertical direction, said casing having one of its sides extended externally and formed with a curved dished out contour having a slot therein, an attachment adapted to pass through the said slot and coordinate with the contour to attach the side to a surface for placing the casing in upright position, an adjustable ball joint member mounted in the upper portion of the casing, an auxiliary coordinating ball member connected with the first mentioned member for enabling the latter to move in various directions without disconnecting therefrom, a rod pending from the auxiliary member and passing through the said passage from one compartment to the second in a vertical position, circuit means connected at the passage for circuit closing when the rod contacts the sides of the passage when swinging out of the vertical position in the casing, a weight on the rod suspended below the passage in the second compartment and adapted to form a pendulum with the rod suspended from the ball joint as aforesaid and prevented by the passage sides from striking the casing, a cap adjustably mounted in the said compartment out of contact with the circuit and for preventing the pendulum from swinging in the casing when the cap is placed on the weight, for making the switch temporarily inoperative.

FRANCIS D. O'TOOLE.